United States Patent [19]

Sharp

[11] 4,348,625
[45] Sep. 7, 1982

[54] VARIABLE SPEED MOTOR SYSTEM

[75] Inventor: Paul H. Sharp, Pasadena, Calif.

[73] Assignee: Marmon Company, Chicago, Ill.

[21] Appl. No.: 105,952

[22] Filed: Dec. 21, 1979

[51] Int. Cl.³ .............................................. H02P 3/18
[52] U.S. Cl. .................................... 318/757; 318/715; 318/721; 318/800
[58] Field of Search ............... 318/757, 758, 759, 760, 318/761, 715, 719, 720, 721, 711, 729, 731, 732, 798, 799, 800, 809

[56] References Cited

U.S. PATENT DOCUMENTS

| | | | |
|---|---|---|---|
| 3,667,016 | 5/1972 | Dunfield et al. | 318/759 X |
| 3,997,827 | 12/1976 | Pajak et al. | 318/761 |
| 4,065,703 | 12/1977 | Schlicher et al. | 318/715 X |
| 4,070,605 | 1/1978 | Hoeppner | 318/758 |
| 4,079,296 | 3/1978 | Dahlen et al. | 318/758 X |
| 4,099,107 | 7/1978 | Eder | 318/721 X |
| 4,181,197 | 1/1980 | Tanabe et al. | 318/758 X |

Primary Examiner—J. V. Truhe
Assistant Examiner—Richard M. Moose
Attorney, Agent, or Firm—Neuman, Williams, Anderson & Olson

[57] ABSTRACT

An electronic system for controlling the speed of a shaded-pole single-phase induction motor provides increased power during speed increase and automatic braking during slowdown by regulation of half-wave D.C. braking current applied to the motor.

Speed control during normal operation, and braking control during slowdown and stopping, are implemented by means of dual feedback loops interactively connected to the gate electrode of a triac in the A.C. current line of the motor. The speed control loop utilizes a frequency/phase detector to adjust the time delay of triac gating relative to the zero crossing points of each half-cycle of A.C. voltage until the tachometer-sensed speed of the motor corresponds to a desired speed set by a voltage controlled oscillator. The braking control loop adjusts the time delay of the triac gating relative to the zero crossing points of every alternate half-cycle of A.C. power thus decelerating the motor by an impressed half-wave pulsed D.C. current.

8 Claims, 7 Drawing Figures

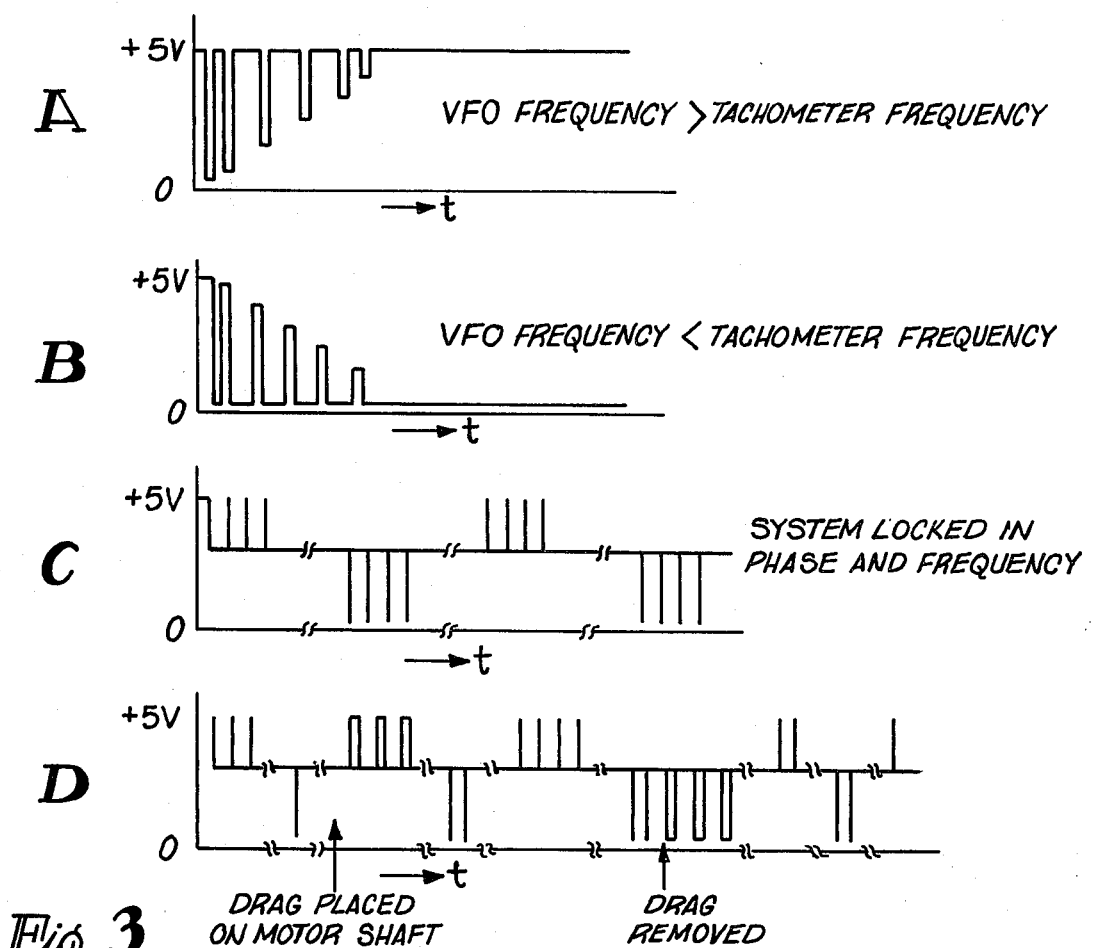
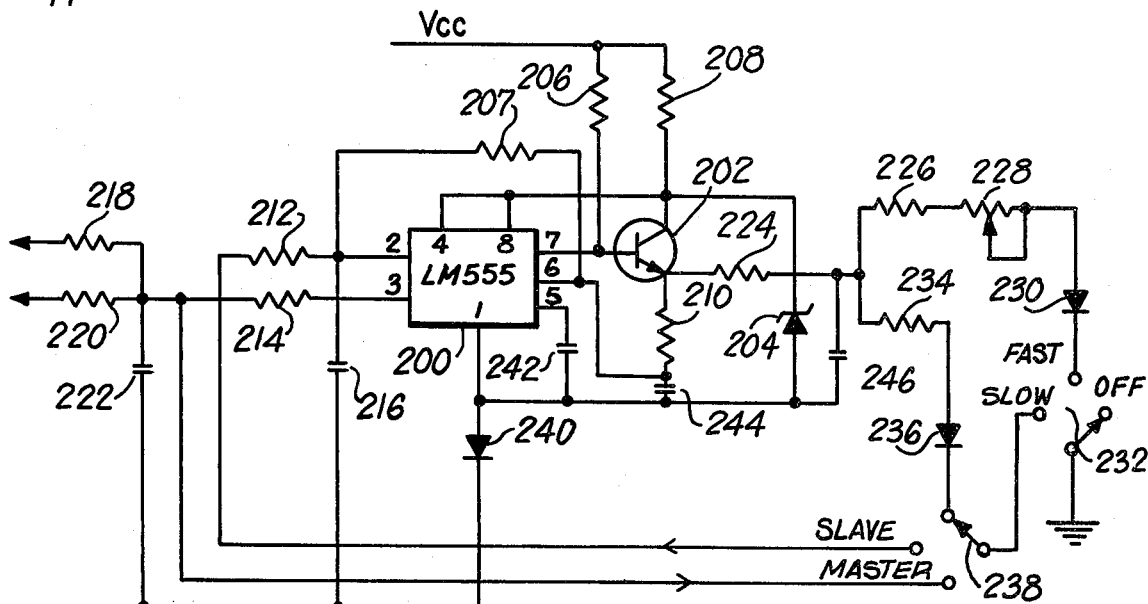

VARIABLE SPEED MOTOR SYSTEM

BACKGROUND OF THE INVENTION

This invention relates generally to speed control of electric motors, and, more particularly, to an electronic system for controlling the speed of a shaded-pole motor.

There are many applications for variable speed where brush or universal motors are unsuitable because of their high cost and objectionable mechanical noise. Shaded-pole motors have long been used in tape recorders, phonographs, desk fans, air circulators and the like where their simplicity, quiet operation, low cost and low maintenance are well suited to the requirements. The inherently high slip of a shaded-pole motor makes it convenient to obtain speed variation by changing the impressed voltage. For example, it is common practice to provide multi-speed operation in such high-load applications as fans by incorporating a small series reactor in the fan base, which can be switched in or out at will. However, this kind of control, while providing multi-speed operation, does not have the variable speed control necessary for many applications where the load is light in nature, among them the production of pulsato for musical instruments. An example of apparatus for producing pulsato by acoustic devices is described in Leslie U.S. Pat. No. 3,245,284 which discloses a main motor for driving a rotor at full pulsato speed, and a secondary motor having an axially floating rotor that is spring-biased normally to be out of alignment with its stator, which when energized pulls the floating rotor into alignment with the stator by solenoid action. This movement is utilized to provide a releasable frictional coupling between the shaft of the secondary motor and a friction wheel carried on the main motor shaft. When the secondary motor is energized and the main motor de-energized, the acoustic rotor is driven at the slower speed of the secondary motor. For producing the "fast", or full pulsato speed, the acoustic rotor is rotated at about five to eight revolutions per second, and for "slow" operation the rotational speed of the rotor is about one-half to one revolution per second. A disadvantage of this sytem is that when the main drive motor is turned off following operation at full pulsato speed, the rotor slowly coasts to a stop without any braking effect, and produces undesirable droning sounds. This is overcome by the system described in Leslie's Patent Ser. No. 4,198,880, which also uses two motors but which provides automatic braking from full pulsato speed to either "slow" speed or to a completely stopped condition. The motors employed in both systems are preferably of the shaded-pole type, but the fact remains that two motors are required to provide "slow" and "fast" operation.

Pulsato producing systems are also known in which an acoustic rotor is belt-driven by a single drive motor and adjustment of pulsato rate between "fast" and "slow" is accomplished with multi-step pulleys. Such systems suffer the disadvantage that different sets of pulleys are required for different line current frequencies; that is, larger pulleys are required in countries where 50 Hz is the standard line frequency in order to obtain the proper pulsato rate, thus frustrating efforts to design a universal pulsato system.

In addition to the series reactor control mentioned earlier, shaded-pole motors have heretofore been controlled by changing the impressed voltage in response to shaft speed information derived by means of a tachometer. This prior art system suffers the serious defect of taking a long time to slow down; thus, if used in an acoustic pulsato system, the earlier-mentioned undesirable droning sounds would be produced when going from "fast" to "slow" operation, or from "slow" to stop.

Ideally, an acoustic pulsato system should include a single, simple, inexpensive, quiet motor for belt-driving a rotor. The speed of the motor should be capable of precise control over approximately a ten-to-one range of both "fast" and "slow" operation, respectively. In addition, the motor should be automatically braked when it is desired to change from "fast" to "slow" or from "slow" to "stop" operation. Other desideratum are that the braking current be automatically removed when the motor shaft has either reached its new operating speed or when the shaft is stopped after motor turn-off, that the motor speed up rapidly when power is applied, and that the speed control be essentially immune to variations in line voltage and frequency.

SUMMARY OF THE INVENTION

A primary object of the present invention is to provide an improved electronic system for controlling the speed of a shaded-pole motor.

A more specific object of the invention is to provide a variable speed motor system for rotating in a sound channel to produce pulsato, phase shift and other musical effects.

Still another object of the invention is to provide a variable speed motor system having the features described above utilizing modern, readily available, inexpensive integrated circuits.

Still another object of the invention is to provide a speed control system for a shaded-pole motor that inherently requires very little energy to maintain set speed.

Briefly, in accordance with the invention the speed of a shaded-pole motor is controlled by an electronic system having a first feedback loop which varies the power applied to the motor in response to a signal derived by comparison of the shaft speed with the frequency of a stable, variable frequency oscillator (VFO). The VFO frequency is operator-controllable to effect a change in the speed of the motor. More particularly, the frequency of a signal produced by a tachometer driven by the motor is compared with the frequency of the signal from the variable frequency oscillator in a frequency phase detector. If one frequency is higher than the other, for example, the variable oscillator frequency is higher than the tachometer feedback frequency, the detector delivers a high output until such time as the two frequencies are equal. The detector then goes into a phase control mode in which it detects phase differences between the two applied signals and provides an output control signal the voltage level of which is high if the tachometer signal is lagging in phase, low if it is leading in phase, and midway between high and low if the two signals are exactly in phase. The signal produced by the phase detector controls a voltage-controlled multi-vibrator which is reset every time the line voltage goes through zero. The multi-vibrator applies a trigger current to a triac connected in series with the motor, at a time delayed from the zero-crossing points of the line voltage. This time delay is determined by the control voltage from the frequency phase detector.

Thus, by controlling the phase of the firing of the triac, the power applied to the motor is varied.

The system further includes a second feedback loop which acts as an electronic braking system for applying braking current to the motor at appropriate times, independent of variations in voltage and/or frequency of the line source. This second feedback loop is used to also apply a delayed trigger current to the same triac, but only every other time the line voltage goes through zero. This unique alternate half-cycle triggering produces a form of half-wave direct current in the motor windings instead of alternating current. In an AC induction motor this AC to DC current modification results in dynamic braking of the motor which avoids the undesirable droning sounds of motors which are permitted to merely coast to a slower speed or to a stop.

BRIEF DESCRIPTION OF THE DRAWINGS

Other objects, features and advantages of the invention will become apparent, and its construction and operation better understood, from the following detailed description, taken in conjunction with the accompanying drawings, in which:

FIG. 3 is a set of waveforms used to explain the operation of the frequency/phase detector of the system; and FIG. 4 is a schematic circuit diagram of a variable frequency oscillator suitable for use in the system of FIG. 2.

DETAILED DESCRIPTION OF THE PREFERRED EMBODIMENT

Figure 1:
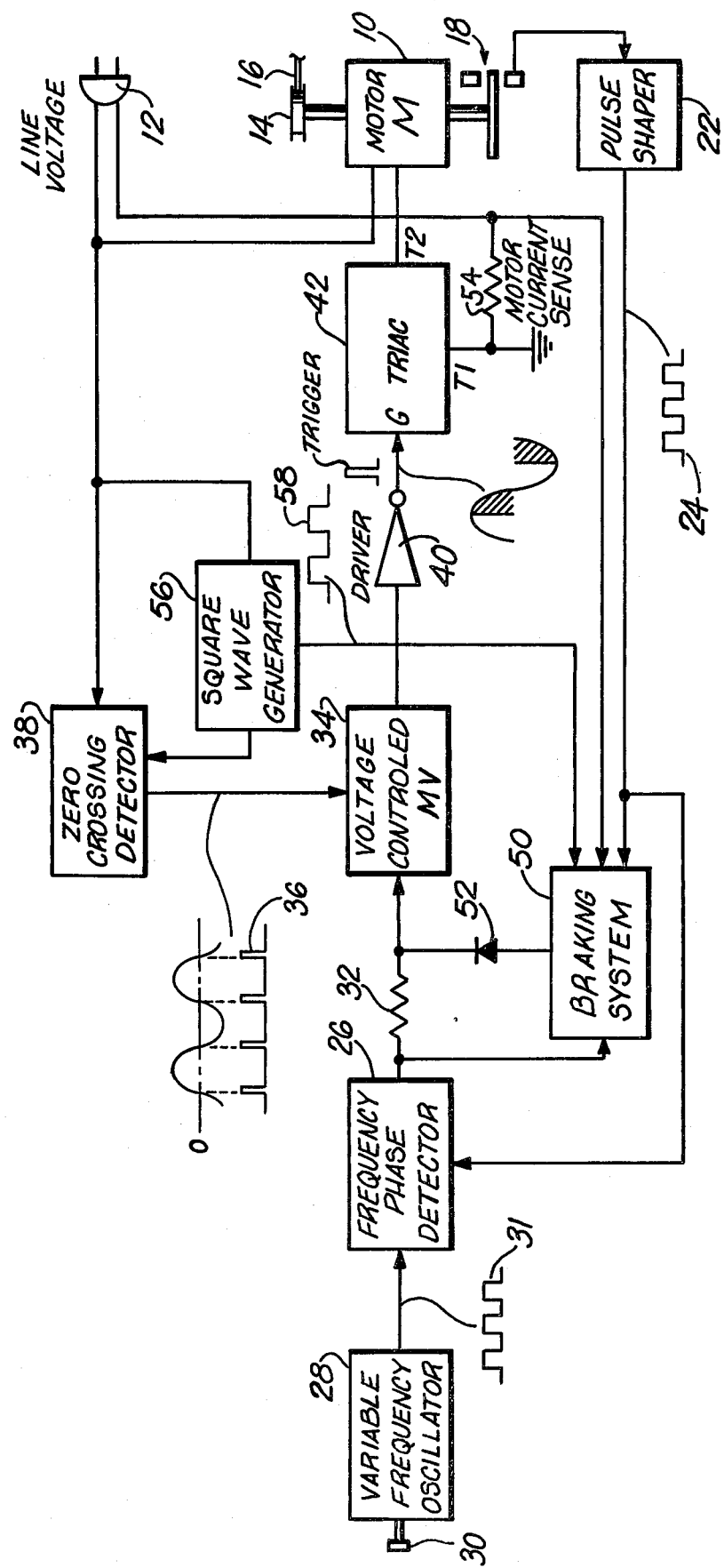
FIG. 1 is a block diagram of a variable speed motor system according to the invention.

The variable speed motor system includes a motor 10 of the shaded-pole type which is energized through a plug 12 to a commercial power source, which has a nominal frequency of 60 Hz in the United States and 50 Hz in many other countries. When used in apparatus for the production of pulsato for musical instruments, the motor is provided with a pulley 14 which is coupled by a belt 16 to a rotor (not shown) the speed or rotation of which determines the pulsato rate. The shaft speed of motor 10 is sensed by a suitable tachometer 18 driven by the motor. Tachometer 18 generates a signal which is proportional to the speed of the shaft. The tachometer may take any of several known forms, including those that generate a voltage whose amplitude is proportional to shaft speed, and those that generate an oscillatory signal the frequency of which is proportional to the speed of the shaft. The latter type may be implemented in a number of ways: For example, the poles of a magnet may be arranged to be driven by the shaft past a pick-up coil so as to induce in the coil an output signal having a frequency proportional to shaft speed. Alternatively, the tachometer may utilize an electro-static pick-up in which a toothed wheel driven by the shaft modulates the signal derived from a charge detector as the teeth move past the detector. Another known form of tachometer, and the one utilized in the preferred embodiment, is the optical type including a light source and a photoelectric pick-up device between which a chopper wheel, driven by the motor shaft, is rotated to generate an oscillatory signal having a frequency proportional to shaft speed. The signal generated by tachometer 18, which may consist of rounded pulses as, is converted in a pulse shaper 22 to a rectangular signal 24. Signal 24 has more uniform parameters to facilitate frequency and phase comparison in a frequency phase detector 26 with rectangular signal 31 generated by a variable frequency oscillator 28. Oscillator 28 desirably is of a type whose frequency is stable with temperature variations, and which can be changed, as by the control diagrammatically shown at 30, to effect a change in the speed of motor 10. In other words, the speed of motor 10 is operator-controllable by selecting the signal frequency of oscillator 28.

Frequency phase detector 26 compares the frequency of the rectangular signal 31 from oscillator 28 with the frequency of the rectangular signal 24 derived from tachometer 18. The output signal of detector 26 is applied through a resistor 32, to a voltage-controlled multi-vibrator 34. If the frequency of one of the signals applied to detector 26 is higher than the other, for example, if the frequency of signal 31 is higher than that of signal 24, the detector produces a high output until such time as the two frequencies are equal. When this equality occurs, detector 26 operates in a phase control mode in which it detects phase differences between the two applied signals and produces an output control voltage which is high if signal 24 lags signal 31 in phase, and low if signal 24 leads signal 31 in phase. When signals 24 and 41 are locked in phase, the output signal of detector 26 is neither high nor low.

Multi-vibrator 34 is re-set by pulses 36 produced by a zero-crossing detector 38 to which the line voltage is applied. The zero-crossing detector produces an output pulse each time the alternating power line voltage crosses the zero value, in both the positive-and-negative-going directions. Multi-vibrator 34 produces a trigger current at a time delayed from the zero-crossing points, the amount of the delay being determined by the control voltage produced by phase detector 26. This trigger current is applied through a driver 40 to the gate electrode G of a triac 42, main terminal T1 of which is connected to ground and main terminal T2 of which is connected to one terminal of the winding of motor 10. If the control voltage applied to multi-vibrator 34 is low, triac 42 does not fire until near the end of the associated half-cycle of the line voltage, and if the control voltage is high, the triac is fired near the beginning of the associated half-cycle of the line voltage. Thus, by controlling the phase of firing of triac 42, the power applied to motor 10 is varied. As is known, the load current of a triac may be triggered on by any combination of main terminal T2 voltage and gate-current polarities, with triggering levels differing depending upon the combination used. By using a sensitive-gate triac, it is possible to control its firing with unidirectional gate-current pulses, even though the voltage on the main terminal T2 alternates in polarity.

The described control circuit is operative to apply power to motor 10 in an amount to cause the rectangular signal 24, which is proportional to the shaft speed, to correspond in frequency and phase with the rectangular signal 31. In other words, the system causes the speed of motor 10 to be directly proportional to the selected frequency of oscillator 28. Oscillator 28 is preferably isolated from the balance of the control system so as to protect the oscillator from the hazards of the line voltage.

While the system thus far described has the capability of precisely controlling the speed of motor 10 over a significant range, there are situations, such as the pulsato application described earlier, in which it is desired to automatically brake the motor when shifting from "fast" to "slow" speed, or when going from either "fast" or "slow" to stop. To this end, the system further includes a braking system shown as a block 50 in FIG. 1, which at appropriate times generates a braking control signal. This braking control signal is also applied to the input terminal of multi-vibrator 34 through a diode 52 to modify the gate-current applied to triac 42. An additional signal from frequency phase detector 26 inhibits braking system 50 whenever motor 10 is in the operating mode.

Rectangular signal 24, generated by tachometer 18, is also applied to the braking system to indicate that the motor shaft is turning so that braking may be applied if otherwise called for. Conversely, absence of signal 24 signifies that the motor shaft is not turning and inhibits operation of braking system 50. A third input signal to the braking system is derived from one terminal of motor current sense resistor 54 connected in series with the motor winding. This sense signal determines the amount of braking to be applied in response to the magnitude of the current flowing through the motor, thereby enabling control of the braking current with no significant effect from line voltage variations. A fourth input signal to braking system 50 is a square-wave signal 58 generated by a square-wave generator 56 in response to the line voltage and having the same frequency as the power source, namely, 60 Hz, or 50 Hz, as the case may be. The frequency of the positive-going pulses in pulse train 58 is only half that of the pulses from zero-crossing detector 38. This frequency causes a control signal to be applied to multi-vibrator 34 only on alternate half-cycles of the line voltage. Therefore, triac 42 fires only on every other half-cycle and provides a pulsating DC braking current to motor 10. The manner in which system 50 operates to achieve the braking function will be described in detail in connection with a preferred implementation thereof illustrated in FIG. 2.

Figure 2:
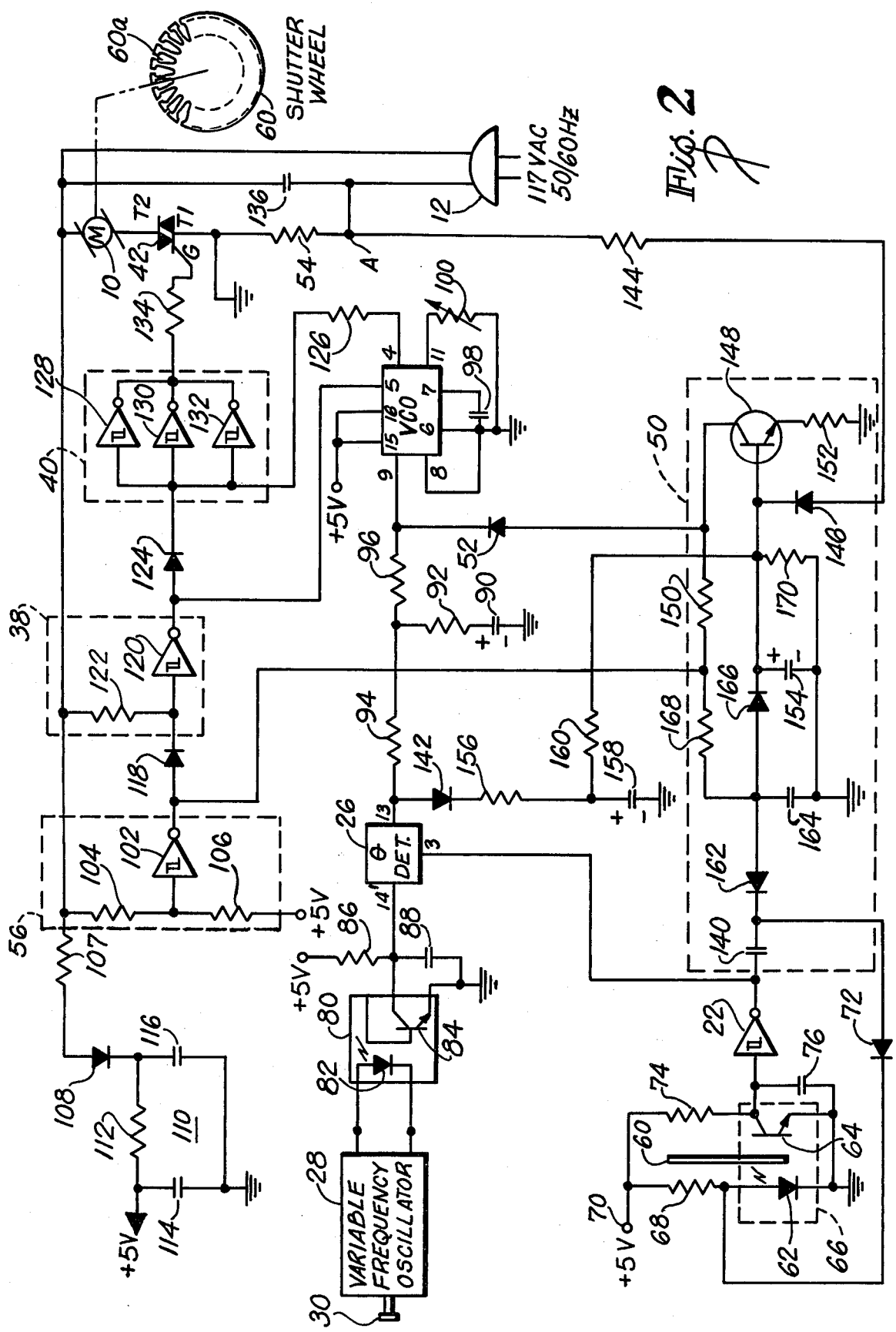
FIG. 2 is a schematic circuit diagram of a preferred implementation of the system of FIG. 1.

Turning now to FIG. 2, tachometer 18 consists of a shutter wheel 60 having a number (19 in the preferred embodiment, however any number between 16 and 32 has been shown to be satisfactory) of slots or openings 60a uniformly distributed around its circumference through which a beam of light from a light-emitting diode 62 is passed to a phototransistor 64. The light-emitting diode and the phototransistor are commercially available in a common package 66 and arranged with a slot between them for receiving the disc 60 in a position where it can periodically interrupt the light beam as it rotates. The LED is energized through a resistor 68, typically having a value of 330 ohms, from a +5 volts source, represented by terminal 70, the cathode of the LED being connected to ground.

A voltage drop of approximately 1.1 volts developed across the LED is coupled from the junction of resistor 68 and LED 62 through a diode 72 and is utilized as a fixed bias voltage in the braking system (to be described). The collector of phototransistor 64 is energized from source 70 through a resistor 74, typically having a value of 15 K ohms. The light passing through the openings 60a in the rotating disc 60 illuminates the phototransistor, rendering it conductive, causing the collector voltage to go low. When the light is blocked, the phototransistor is in a high impedance state and causes the collector voltage to go high. A capacitor 76, typically having a value of 33 picofarads, connected between the collector of the phototransistor and ground, bypasses any RF or high frequency spikes that might be present in the vicinity of the equipment.

The packaged LED and phototransistor operate satisfactorily in the presence of ambient light, provided the light isn't too bright and too close to the unit. For example, the system has operated satisfactorily with a 100 watt bulb placed about four feet from the unit. The output at the collector of phototransistor 64 is applied to pulse shaper 22 which, in the present embodiment, consists of one of the six Schmitt triggers contained in the CD40106B Type COS/MOS, Hex Schmitt triggers commercially available from RCA and others. Each circuit functions as an inverter with Schmitt-trigger action on the input. The trigger switches at different points for positive-and negative-going signals. The difference between the positive-going voltage and the negative-going voltage is defined as the hysteresis voltage.

In operation, if it is assumed that the input voltage starts out low, the output voltage is initially high (approximately +5 volts in the present circuit) and as the input voltage rises to approximately two-thirds of the supply voltage, the output suddenly switches to its low state (zero volts in the present circuit) and remains there as the input voltage continues to rise to its high value of, say +5 volts. Then, as the input voltage is decreased, it is necessary to come down to approximately one-third the supply voltage before the output will switch to its high state, at which it will stay as the input voltage goes down to zero. This means that there is approximately one-third supply voltage hysteresis in each direction, so that a small amount of noise or other extraneous signals at the input will not cause the output to change states, thus providing noise immunity and also greatly increasing the speed of the transition from high to low and from low to high. The Schmitt trigger increases the rise time of the pulses produced by phototransistor 64 and eliminates low levels of noise that might be caused by other light sources modulating the light beam. As a result, the output signal of pulse shaper 22 is a rectangular wave the frequency of which is proportional to the shaft speed of motor 10. This rectangular signal, 24, is applied to frequency phase detector 26 and also to braking system 50, the operation of both of which will presently be described.

Output signal 31 of variable frequency oscillator 28 (a specific implementation of which is described below) is coupled to detector 26 through an optical isolator 80 consisting of a light-emitting diode 82 and a phototransistor 84, both contained within an integrated circuit commercially available as Type H11A3. Since the motor speed control system is powered from a standard AC line, oscillator 28, the frequency determining standard for the control system, is isolated from the AC power line to avoid any hazardous voltages on the control leads to the motor control system. The output signal from optical isolator 80 is applied to detector 26. The collector of phototransistor 84 is energized through a resistor 86, typically having a value of 15 K ohms, from a +5 volts source. The collector of phototransistor 84 is connected through a radio frequency bypass capacitor 88 to ground.

Detector 26 preferably is the phase comparator section of the CD4046B Type COS/MOS Micropower Phase-Lock Loop integrated circuit, commercially available from RCA, and fully described in RCA Application Note ICAN-6101 entitled "The RCA COS/MOS Phase-Locked-Loop, A Versatile Building Block for Micro-Power Digital and Analog Applications" dated 10/72. The rectangular signal from the optical isolator 80 is direct-coupled to the "signal in" pin (Pin 14) of the comparator and the tachometer signal 24, from pulse shaper 22, is applied to the "comparator in" pin (Pin 3). The device is operative to compare the frequencies of the two applied signals and produce an output signal at its "phase comp" pin (Pin 13), the operation being as follows: If the frequency of oscillator 28 is higher than the frequency tachometer 18, the output signal at Pin 13 of detector 26 is high, or approximately +5 volts, with irregular negative going pulses occurring occasionally, as illustrated in waveform A of FIG. 3. If the tachometer signal has the higher frequency, the signal at Pin 13 is low, with positive pulses occurring occasionally, as depicted in waveform B of FIG. 3.

If the two applied signals have the same frequency, the output of detector 26 is determined by the phase difference between the two signals. If they are locked in phase, there is no output on Pin 13 and, indeed, it will be open-circuited and free to float in any direction. Thus, in order for the detector to be useful, a memory device is utilized. This memory device is provided by a capacitor 90, typically having a value of 1 microfarad. Capacitor 90 is connected to the output pin (Pin 13) of the detector through a resistor 92, typically having a value of 180 K ohms, and a resistor 94, typically having a value of 1 megohm. Thus, if the oscillator frequency is higher than the tachometer frequency, the output signal causes the voltage on capacitor 90 to increase, and, conversely, if the tachometer frequency is higher, the voltage on capacitor 90 decreases. When the two signals are equal in frequency and phase, Pin 13 of the integrated circuit is open-circuited and the voltage on capacitor 90 remains constant.

When the two input signals to detector 26 are of the same frequency, but the oscillator signal leads the tachometer signal in phase, positive pulses are produced at the output, the widths of which are determined by the amount of phase difference that exists. Conversely, if the tachometer signal leads the oscillator signal in phase, negative pulses are produced, the widths of which, again being determined by the amount of phase difference. Thus detector 26 provides an effective comparator device that, as will be hereinafter further delineated, is used to bring the two signals into frequency and phase correspondence. Resistors 92 and 94 and capacitor 90 also provide a filtering action which serves to minimize "hunting" and to shorten the lock-up time of the phase-locked loop in detector 26. The tendency of the system to "hunt" back and forth as the motor attempts to reach the speed called for by the variable frequency oscillator 28, is minimized by resistor 92, in that it allows a small amount of very rapid correction to take place. More particularly, the voltage divider formed by resistors 94 and 92 causes approximately one-fifth of the amplitude of the control voltage produced by detector 26 to be applied, without filtering by capacitor 90, to the voltage controlled multi-vibrator 34 (to be described) allowing substantially instantaneous changes in the delay time of the multi-vibrator and facilitating lock-up of the system.

A certain amount of hunting will still occur and, therefore, series of narrow positive-and negative-going pulses are produced in the phase locked mode at steady speed as shown in waveform C of FIG. 3. Furthermore, when the motor shaft is mechanically loaded, such as by a pulley and belt connected to an acoustic rotor in a pulsato musical system, drag is periodically increased and decreased. Waveform D of FIG. 3 illustrates the phase detector output signal tending to compensate for increased and reduced drag on the motor.

The output signal developed by detector 26 and its associated circuitry is applied to the voltage-controlled multi-vibrator 34 through a resistor 96, typically having a resistance value of 1 megohm. In the present embodiment, the multi-vibrator comprises the voltage-controlled oscillator section of the aforementioned CD4046B Type integrated circuit which functions as a re-settable, voltage-controlled multi-vibrator. This is accomplished by grounding Pin 6 of the integrated circuit and using the "inhibit" pin (Pin 5) to receive a re-set pulse, timed to re-set the multi-vibrator every half-cycle of the line voltage.

When the voltage at Pin 5 is high, a timing capacitor 98 connected between Pins 6 and 7 is discharged, and the output at Pin 4 of the integrated circuit, goes low. When the voltage at Pin 5 is low, the integrated circuit is in its non-inhibit mode, causing capacitor 98 to start to charge. At the same time, the output signal on Pin 4 goes high, where it remains until such time as the voltage on capacitor 98 reaches a predetermined value. When capacitor 98 reaches the predetermined voltage level, the output on Pin 4 goes low and remains low until the VCO is again inhibited by Pin 5 going high. The charge time for capacitor 98 is determined by the current fed to it from Pin 7 of the integrated circuit, this current being controlled by the voltage applied to input Pin 9, and to some extent by the value of a resistor 100 connected between Pin 11 and ground. When the signal voltage applied to Pin 9 is high, the current fed to capacitor 98 is high and charges it quickly. Conversely, when the signal voltage is low, the charging current is low, and the capacitor 98 charges very slowly. Thus, the values of capacitor 98 and resistor 100 determine the range over which the charge time for capacitor 98 will vary, variable resistor 100 providing adjustment of the range.

The inhibit pulses applied to Pin 5 of multi-vibrator 34 are derived from zero-crossing detector 38 which, in the present embodiment, operates in conjunction with the square-wave generator 56. Accordingly, their operation will be considered together, commencing with a description of the square-wave generator. Square-wave generator 56 includes a Schmitt trigger 102, which may be a second of the six Schmitt triggers contained in the aforementioned CD40106B Type integrated circuit, and which has the characteristics described above in connection with pulse shaper 22. The input terminal of Schmitt trigger 102 is connected to the junction of resistors 104 and 106 which are, in turn, connected in series between the line voltage source and +5 volts D.C. The line voltage source is also connected through a resistor 107 and a diode 108 to a filter network 110 consisting of a resistor 112 and a pair of capacitors 114 and 116. One terminal of each of capacitors 114 and 116 is connected to ground, and the junction of resistor 112 and capacitor 114 supplies +5 volts D.C. to the rest of the circuit. Resistors 104 and 106 typically have values of 220 K ohms and 100 K ohms, respectively.

When the line voltage is at zero volts, because resistor 106 is connected to the +5 volts supply, the voltage dividing action of resistors 104 and 106 causes slightly more than two-thirds of the supply potential to be applied to the input of Schmitt trigger 102. This input voltage will, for the discussion to follow, be considered high. Because of the inversion that takes place in Schmitt trigger 102, the output is then low. As the line voltage rises in the positive direction, the input remains high and the output remains low until such time as the line voltage comes down through zero and sufficiently negative to counterbalance the +5 volts supplied to resistor 106. This occurs when the input voltage to Schmitt trigger 102 drops to approximately one-third of the D.C. supply voltage, at which time the output goes high. As the line voltage continues to increase in the negative direction, the output of trigger 102 remains high until such time as the line voltage reverses direction and comes back up to approximately zero volts. Thus, the output of Schmitt trigger 102 is a square-wave inverted with respect to the applied line voltage.

This square-wave signal is applied to braking system 50 (to be described) and is also coupled via a diode 118 to zero crossing detector 38 at the input of another Schmitt trigger 120, which may be a third one of the six trigger circuits of the aforementioned CD40106B integrated circuit. The line voltage is also applied to the input of detector 38 through a resistor 122. In operation, if the line voltage is substantially positive, the output of Schmitt 120 goes low. At the same time the output of Schmitt trigger 102 will be low, causing diode 118 to be reverse-biased. The circuit remains in this condition until the line voltage drops to approximately one-third the supply voltage at which time the output of trigger 120 goes high. Then, as the line voltage continues to go down through zero and in the negative direction, the output of Schmitt trigger 102 also goes high, thus forward-biasing diode 118 and causing the input of Schmitt trigger 120 to go high and its output to go low. This condition is maintained as the line voltage continues to go negative. Thus, there is only a very small region near the zero-crossing of the line voltage where the output of Schmitt trigger 120 can be high. The resulting sequence of narrow positive pulses, one occurring at each zero-crossing, is applied to Pin 5 of voltage-controlled multi-vibrator 34. For reasons to be described below, these narrow pulses are also applied through a diode 124 to a driver circuit 40.

The use of the VCO section of the CD4046B Type integrated circuit as voltage-controlled multi-vibrator 34 in the manner previously described, introduces the anomaly that its output signal at Pin 4 goes low during the high period of the inhibit pulses applied to Pin 5 from the output of Schmitt trigger 120. if that low signal were fed to a driver that inverts the signal (the implementation used in the present embodiment, to be described) a trigger pulse would be applied to triac 42 during the zero-crossing line. Although at such an occurrence the triac would still be conducting from the previous half-cycle of the line voltage, (it does not stop conducting until the motor current goes to zero, which is usually delayed in phase from the applied line voltage going to zero), it was observed that the triac could intermittently latch up into a half-wave mode of operation when the gate current was applied at zero-crossings.

This anomaly is circumvented by applying the output signal (from Pin 4) of the multi-vibrator to driver 40 through a resistor 126, typically having a value of 100 K ohms, which is ORed by diode 124 with the output pulses from zero-crossing detector 38. Driver 40 consists of the remaining three Schmitt triggers contained in the aforementioned CD40106B Type integrated circuit with their respective input and output terminals connected to provide adequate drive current through a resistor 134, typically having a value of 470 ohms, to the gate electrode of sensitive-gate triac 42.

Thus, when the pulse signal from zero-crossing detector 38 goes high, it will maintain the output of the inverter driver 40 in a low state during the time the multi-vibrator is inhibited. Consequently, there will be no current pulse supplied to the triac until such time as the multi-vibrator reaches its charging value to cause its output to go low. The inhibit pulse will also have been low, of course, therefore causing the output of inverter driver 40 to go high and providing gate current to triac 42. Thus, provision of resistor 126 and diode 124 eliminates the possibility of abnormal operation. A capacitor 136, typically having a value of 0.01 microfarads, is connected across the line voltage source for absorbing any noise that may be generated by the motor control system and to prevent the same from being radiated by the power line connections. Main terminal T2 of triac 42 is connected to one terminal of resistor 54, typically having value of 1 ohm, for sensing the current flowing in the motor winding and generating a voltage at point A proportional to motor current. This motor current sensing voltage is fed to the braking system for purposes to be described presently.

Braking system 50 applies an appropriate level of braking current to motor 10 when it is desired to go from "fast" to "slow" operaton, or from "slow" to stop. Braking system 50 receives information from five different points in the described control circuit as follows: First, the tachometer signal from pulse shaper 22 is applied via a capacitor 140; second, the 1.1 volts bias voltage developed across light-emitting diode 62 is applied via diode 72; third, the square-wave signal at the output of Schmitt trigger 102 is applied; fourth, the signal from phase detector 26 is applied via diode 142; and fifth, the motor current voltage developed at point A via a resistor 144, typically having a value of 470 K ohms, and a diode 146.

The output of the braking system is at the collector of a transistor 148, and is applied through diode 52 to Pin 9 of voltage-controlled multi-vibrator 34. The basic braking action is provided by the square-wave signal from Schmitt trigger 102 passing through a resistor 150, typically having a value of 1 megohm, and through diode 52 to the input at Pin 9 of voltage-controlled multi-vibrator 34. Since this square-wave signal is high every other half-cycle of the line voltage, the multi-vibrator produces an output and triggers triac 42 to produce half-wave direct current through motor 10. The amplitude of the square-wave signal at the collector of transistor 148 determines the phase angle at which triac 42 is gated on, and thus determines the amount of braking current in the motor. This is accomplished in the same manner as previously discussed for the control signal produced by phase detector 26 during the normal run mode, but because the triac is gated only every other half-cycle, dynamic braking action is the result.

The emitter of transistor 148 is connected to ground through a resistor 152, typically having a value of 100 K ohms. Transistor 148 controls the square-wave signal amplitude at its collector in response to the current feedback signal from point A applied to its base electrode. The direction of current flow in current-sensing resistor 54 is such as to cause the potential at point A to be positive with respect to ground. This positive voltage is applied through resistor 144 and diode 146 to a capacitor 154, typically having a value of 1 microfarad, connected between the base of transistor 148 and ground, charging the capacitor in a positive direction. The positive charge on capacitor 154 causes the transistor 148 to conduct, thereby reducing the voltage at its collector which, in turn, reduces the current through the motor. It will be evident that this is a negative feedback system and functions to stabilize the braking current under varying line voltage conditions.

When motor 10 is in the normal run mode, during which braking is not wanted, braking system 50 is disabled by the control signal developed by phase detector 26. It will be recalled from the earlier description of its operation, that in the run mode, phase detector 26 produces periodic positive pulses at its output. This output signal is coupled via diode 142 and a resistor 156, typically having a value of 100 K ohms, to charge a capacitor 158 positively. This causes current to flow in a resistor 160, typically having a value of 470 K ohms, connected between the junction of resistor 156 and capacitor 158 and capacitor 154 which changes capacitor 154 and turns transistor 148 on. Conduction of transistor 148 causes the voltage at its collector electrode to be lower than the control voltage developed by phase detector 26, which reverse-biases diode 52. Thus, the control voltage from detector 26 controls the voltage-controlled multi-vibrator through resistor 96.

It is to be noted that the input impedance of the multi-vibrator is extremely high so there is only a negligible voltage drop across resistor 96. In the braking mode, however, when the voltage at the collector of transistor 148 is higher than the control voltage developed by detector 26, there will be a non-negligible voltage drop across resistor 96. Resistor 96 alternatively may be a diode, but if this substitution were made, a resistor from Pin 9 to ground would be needed.

When it is desired to either stop or reduce the speed of motor 10, the frequency of variable frequency oscillator 28 is manually reduced by an amount to establish the desired new speed. A reduction in the frequency of the signal from oscillator 28 causes phase detector 26 to produce negative or low pulses, causing capacitor 158 to discharge which, in turn, reduces the current conducted by transistor 148. As a result, the voltage at the collector of transistor 148 rises sufficiently to take over control of voltage-controlled multi-vibrator 34 and to apply braking current to the motor.

After motor 10 is stopped and the motor shaft comes to rest, the braking current is removed. The signal appearing at the output of pulse shaper 22, is a 5 volt pulsed wave as long as the motor shaft is turning. When the voltage at output terminal of pulse shaper 22 is high, capacitor 140 will receive a charge of about 3.5 volts through diode 72. When the pulse shaper output is low, this charge is partially transferred through a diode 162 to a capacitor 164, typically having a value of 0.022 miocrofarads, thereby producing a negative potential at the junction of diode 162 and capacitor 164. This negative potential reverse-biases a diode 166 connected between that junction and the base of transistor 148. Consequently, the negative potential has no effect on the braking system. However, when the motor shaft stops there is no output signal from pulse shaper 22, and the current from the output of square-wave generator 56 through a resistor 168, typically having a value of 470 K ohms, charges capacitor 164 to a level such that the junction of diodes 162 and 166 is positive by approximately twice the diode voltage drop above the 1.1 volts bias potential developed across light-emitting diode 62 and applied via diode 72 to the junction of capacitor 140 and diode 162. This potential forward-biases diode 166 and the resulting potential applied to the base of transistor 148 causes the transistor to conduct, lowering its collector potential sufficiently to remove the braking current. It will be appreciated that if the potential at the junction of capacitor 140 and diode 162 were at ground potential, the voltage drop across diodes 162 and 72 would not allow the junction of capacitor 140 and diode 162 to go sufficiently positive to turn on transistor 148. This is the reason that the junction of capacitor 140 and diode 162 is connected to receive the 1.1 volt bias potential developed across light-emitting diode 162.

In summary, the described braking system senses that the shaft is turning and automatically applies braking current when the frequency of oscillator 28 is reduced, signifying that braking is necessary. However, when the shaft stops turning, the absence of a tachometer signal automatically inhibits the braking system and removes the braking current applied to stop the motor. The motor current sensing resistor 54 automatically provides control over the amount of braking as a function of the motor current, thus enabling control of the braking current independent of line voltage variations. By combining the output signal of braking system 50 with the signal produced by phase detector 26, before application to the input of voltage-controlled multi-vibrator 34, either the braking system electronics or the frequency phase detector electronics control the multi-vibrator, and the firing angle of triac 42. The two sets of firing angle electronics comprise dual feedback loops, one for normal running mode speed control and one for braking control. The two loops are interactive in that braking action is automatically initiated only when VFO 28 is adjusted for a slower rate of desired speed or a stopped condition. When initiated, braking action is the sole control of the gating of triac 42. However, when the motor speed has decreased sufficiently or stopped as the case may be, normal running speed control resumes sole control of the gating of triac 42. The braking loop triggers the triac every second half-cycle of line current to produce a dynamic braking effect. The speed control loop triggers the triac every half-cycle of line current to produce running power. Both loops trigger the triac at time delayed from the immediately preceeding zero voltage crossing point of line voltage, the delay being dependent on the amount of braking current or running current determined by the selected rate of motor operation.

It will now be clear that VFO 28 should preferably be capable of generating a stable pulsed signal of fairly constant amplitude and of variable frequency selectable in the range corresponding to the variation of desired motor speeds. Furthermore, it will be readily apparent that there are virtually unlimited VFO devices and circuits that would be suitable for use as VFO 28. Thus the circuit of VFO 28 of the preferred embodiment, which is shown in detail in FIG. 4, is merely one configuration that has been found suitable for the present invention when it is used in conjunction with acoustic rotors of pulsato musical systems. In particular, the switching and frequency setting characteristics of the oscillator circuit of FIG. 4 have been specifically selected for compatibility with prior pulsato controls of musical systems. Accordingly, the VFO circuit of FIG. 4 will be only briefly discussed for purposes of providing a full disclosure of an operational embodiment of the present invention.

The VFO circuit of FIG. 4 utilizes a type 555 integrated-circuit timer 200 available from a number of manufacturers including Signetics. Pin 3 of timer 200 is the output terminal which applies the selected frequency signal through resistor 214 and 220 to isolator 80 of FIG. 2. The output signal of timer 200 is also available through resistor 218 to an additional circuit (not shown) of the same configuration as the circuit of FIG. 2, for control of a second shaded-pole motor. It is in this fashion that the present invention may be used to synchronize the speed of a plurality of shaded-pole motors.

The circuit of FIG. 4 also includes a transistor 202, the base electrode of which is connected to Pin 7, the Discharge terminal of timer 200; the collector electrode of which is connected to Pin 4, the Reset terminal of the timer; and the emitter electrode of which is connected through resistor 210 to Pin 6, the threshold terminal of the timer. The frequency of the VFO circuit of FIG. 4 is determined primarily by the values of capacitor 244 and the resistor network in the emitter circuit of transistor 202 as will be readily apparent to those skilled in the electronics art. Thus the frequency of the VFO is determined by the position of switch 232 and the values of fixed resistor 234 in the "slow" position and of fixed resistor 226 and variable resistor 228 in the "fast" position. Diodes 230, 236 and 240 provide circuit isolation while capacitor 222 serves the purpose of noise suppression at the output terminal of the timer. The output terminal (Pin 3) and a trigger terminal (Pin 2) of timer 200 are connected to the master and slave terminals, available to other such circuits so that timer 200 may become a trigger source for ("master"), or be triggered by, ("slave"), similar timers in other variable frequency oscillators. A jumper 238 is used in the "slow" path for compatibility purposes as referred to previously.

Table I below provides a list of component values for resistors and capacitors of the circuit of FIG. 4 used in the pulsato musical instrument application of the invention.

TABLE I

| Component | Value |
|---|---|
| 206 | 6.8K Ohms |
| 207 | 100K Ohms |
| 208 | 220 Ohms |
| 210 | 20K Ohms |
| 212 | 22K Ohms |
| 214 | 220 Ohms |
| 216 | 200 P.F. |
| 218 | 1K Ohms |
| 220 | 1K Ohms |
| 222 | .0047 μF |
| 224 | 2.74K Ohms |
| 226 | 2.74K Ohms |
| 228 | 5K max Ohms |
| 234 | 68K Ohms |
| 242 | .022 μF |
| 244 | .022 μF |
| 246 | 16 μF |

The foregoing description sets forth only sufficient details to enable a person skilled in the art to make and use the invention and describes the best mode now contemplated for practicing the invention. Such details of design, construction and assembly have been omitted since they are well known in the art.

For the most part the invention has been described with reference to a shaded-pole induction motor used to drive the acoustic rotor of a pulsato musical instrument. However, it will be understood that the invention is also useful in other applications in which the speed of a shaded-pole induction motor is to be controlled, irrespective of the nature of the mechanical load applied to the motor.

It will be understood, therefore, that the invention may be practiced in many ways other than those specifically described and may be implemented in many different ways, both electrically and mechanically, without departing from the scope of the invention.

The invention claimed is:

1. A circuit for controlling the rate of rotation of a shaded-pole motor comprising:
   means for sensing the actual rate of rotation of said motor and for generating a signal having at least one parameter proportional to said actual rate;
   means for selecting a desired rate of rotation of said motor and for generating a signal having at least one parameter proportional to said desired rate;
   means responsive to said actual and desired rate proportional signals for generating a signal having at least one parameter proportional to the difference between said actual and desired rates;
   a source of line power connected to said motor;
   means for sensing the zero-crossing points of the AC voltage of said line power and for generating a pulse at each zero-crossing point;
   switching means connected in series between said source of power and said motor for applying line current to said motor during a portion of each half-cycle of line voltage; and
   delayed activation means responsive to said zero-crossing pulse and said difference proportional signal and having an output signal for activating said switching means to apply line current to said motor during a portion of each half-cycle of line voltage at a time delayed from the zero-crossing point of said line voltage, the amount of said time delay being dependent on said difference proportional signal, said applied line current renders said actual rate equal to said desired rate after several half-cycles of line voltage.

2. A circuit for controlling the rate of rotation of a shaded-pole motor comprising:
   means for sensing the actual rate of rotation of said motor and for generating a signal having at least one parameter proportional to said actual rate;
   means for selecting a desired rate of rotation of said motor and for generating a signal having at least one parameter proportional to said desired rate;
   means responsive to said actual and desired rate proportional signals for generating a signal having at least one parameter proportional to the difference between said actual and desired rates;
   a source of line power connected to said motor;
   means for sensing the zero-crossing points of the AC voltage of said line power and for generating a pulse at each zero-crossing point;
   switching means connected in series between said source of power and said motor for applying line current to said motor during a portion of each half-cycle of line voltage;
   delayed activation means responsive to said zero-crossing pulse and said difference proportional signal and having an output signal for activiating said switching means to apply line current to said motor during a portion of each half-cycle of line voltage at a time delayed from the zero-crossing point of said line voltage, the amount of said time delay being dependent on said difference proportional signal, said applied line current renders said actual rate equal to said desired rate after several half-cycles of line voltage;

sensing means for generating a signal representative of the magnitude of line current flowing through said motor;

inhibit means responsive to said difference proportional signal for generating an override signal to inhibit said delayed activation means when said actual rate exceeds said desired rate by a predetermined amount; and automatic braking circuit means receiving said line current sensing signal and said zero-crossing pulses for activating said switching means during every second half-cycle of line voltage at a time delayed from the zero-crossing point of said line voltage to produce a variable half-wave direct braking current in said motor.

3. A circuit for controlling the speed of a shaded-pole motor comprising:

a first feedback loop having a tachometer for sensing the actual speed of said motor and for generating an speed signal the frequency of which is proportional to said motor speed, a variable frequency oscillator generating a desired speed signal the frequency of which is selectable and indicative of a desired speed of said motor, a frequency/phase detector for comparing the frequency and phase of said speed signal with the frequency and phase of said desired speed signal and for generating a pulse signal and polarity the amplitude of which are indicative of the frequency and phase difference of said speed signals, means for sensing the zero-crossing points of the AC voltage of the power line to which the motor is connected and for generating pulses, one such pulse occurring at each such zero-crossing, means for generating a speed control gating signal at a time delayed from each said zero-crossing, the amount of said time delay being dependent on the polarity and amplitude of said pulse signal;

a second feedback loop having means for generating a braking control signal the amplitude of which is proportional to the amount of desired speed, means for generating a braking current gating signal at a time delayed from each alternate one of said zero-crossings, the amount of time delay being dependent on the amplitude of said braking control signal;

a triac having a gate terminal and main terminals, said main terminals being connected in series with said motor and adapted to apply AC current to said motor during the remainder of the half-cycle following said speed control gating signal or said braking current gating signal; and means for automatically applying said braking current gating signal to said triac gate terminal overriding said speed control gating signal when said actual speed exceeds said desired speed by a predetermined amount.

4. A circuit for controlling the speed of at least one shaded-pole motor which determines the pulsato frequency applied to the acoustic mechanism of a musical instrument having means coupling said motor to said acoustic mechanism for rotation thereof at a rate proportional to the speed of said motor, said circuit comprising:

a first feedback loop for adjusting motor speed during a normal running mode by gating current into said motor during each half-cycle of line voltage for a duration dependent upon whether the speed of said motor is less than or greater than a desired speed, and a second feedback loop for braking said motor during a slowing or stopping mode by gating current into said motor during each alternate half-cycle of line voltage for a duration dependent upon the extent to which the speed of said motor is greater than a desired speed.

5. The circuit as set forth in claim 4, further comprising:

a switching means connected in series with said motor, and receiving gating current generated by said first and second feedback loops and for applying line current to said motor during the remainder of the half-cycle following reception of said gating current.

6. A circuit as set forth in claim 5, wherein said first feedback loop comprises:

a tachometer for sensing the actual speed of said motor and for generating a speed signal the frequency of which is proportional to said motor speed;

a variable frequency oscillator generating a desired speed signal the frequency of which is selectable and indicative of a desired speed of said motor;

a frequency/phase detector for comparing the frequency and phase of said speed signal with the frequency and phase of said desired speed signal and for generating a pulse signal the polarity and amplitude of which are indicative of the frequency and phase differences of said speed signals;

a source of line power connected to said motor;

means for sensing the zero-crossing points of the AC voltage on the power line and for generating a pulse at each such zero-crossing; and means for generating a speed control gating signal at a time delayed from each said zero-crossing point, the amount of said time delay being dependent on the polarity and amplitude of said pulse signal.

7. A circuit as set forth in claim 6, wherein said second feedback loop comprises:

sensing means for generating a signal representative of the magnitude of the current flowing through said motor;

means to override said gating current of said first feedback loop when said actual rate exceeds said desired rate by a predetermined amount;

automatic braking circuit means receiving said line current sensing signal and said zero-crossing pulses for activating said switching means during every second half-cycles of line voltage at a time delayed from the zero-crossing point of said line voltage to produce a variable half-wave direct braking current in said motor, the amount of said time delay being dependent upon the amplitude of said line current sensing signal.

8. The circuit set forth in claim 2 further comprising:

means responsive to said actual rate proportional signal for inhibiting said braking circuit means when said actual rate is zero.

* * * * *